(12) United States Patent
Hackl

(10) Patent No.: US 6,491,353 B2
(45) Date of Patent: Dec. 10, 2002

(54) PRECHARGING DEVICE IN A HYDRAULIC BRAKE SYSTEM OF A VEHICLE

(75) Inventor: Matthias Hackl, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/893,435

(22) Filed: Jun. 29, 2001

(65) Prior Publication Data

US 2002/0029945 A1 Mar. 14, 2002

(30) Foreign Application Priority Data

Jul. 1, 2000 (DE) .......................... 100 32 185

(51) Int. Cl.$^7$ .............................................. B60T 13/16
(52) U.S. Cl. ........................................................ 303/10
(58) Field of Search .......................... 303/10, 11, 116.1, 303/2

(56) References Cited

U.S. PATENT DOCUMENTS

| | | | | |
|---|---|---|---|---|
| 3,439,662 A | * | 4/1969 | Jones et al. ................. 123/321 |
| 3,524,684 A | * | 8/1970 | Skoyles ........................ 303/10 |
| 3,532,391 A | * | 10/1970 | Klein ..................... 188/181 A |
| 3,639,009 A | * | 2/1972 | Klein et al. ............. 188/181 A |
| 3,840,087 A | * | 10/1974 | Von Loewis et al. ....... 123/495 |
| 3,886,848 A | * | 6/1975 | Budecker et al. ............. 60/413 |
| 4,201,272 A | * | 5/1980 | Midolo ........................ 180/6.3 |
| 4,441,587 A | * | 4/1984 | Patten ....................... 188/70 R |
| 5,540,203 A | * | 7/1996 | Foulkes et al. ............. 123/446 |
| 5,971,500 A | * | 10/1999 | Voges et al. ................ 188/356 |
| 6,073,597 A | * | 6/2000 | Harata et al. .......... 123/179.14 |
| 6,106,078 A | * | 8/2000 | Johnston et al. ......... 303/115.1 |
| 6,330,875 B1 | * | 12/2001 | Bartley et al. .............. 123/446 |

* cited by examiner

Primary Examiner—Jack Lavinder
Assistant Examiner—Benjamin A Pezzlo
(74) Attorney, Agent, or Firm—Ronald E. Greigg

(57) ABSTRACT

The precharging device is part of a hydraulic brake system of a vehicle and serves to impose brake fluid under pressure selectively on a brake assembly, by means of a charging unit. To activate the imposition of brake fluid, the charging unit is operatively connected to a fuel supply system. The charging unit is preferably embodied as a piston unit.

14 Claims, 1 Drawing Sheet

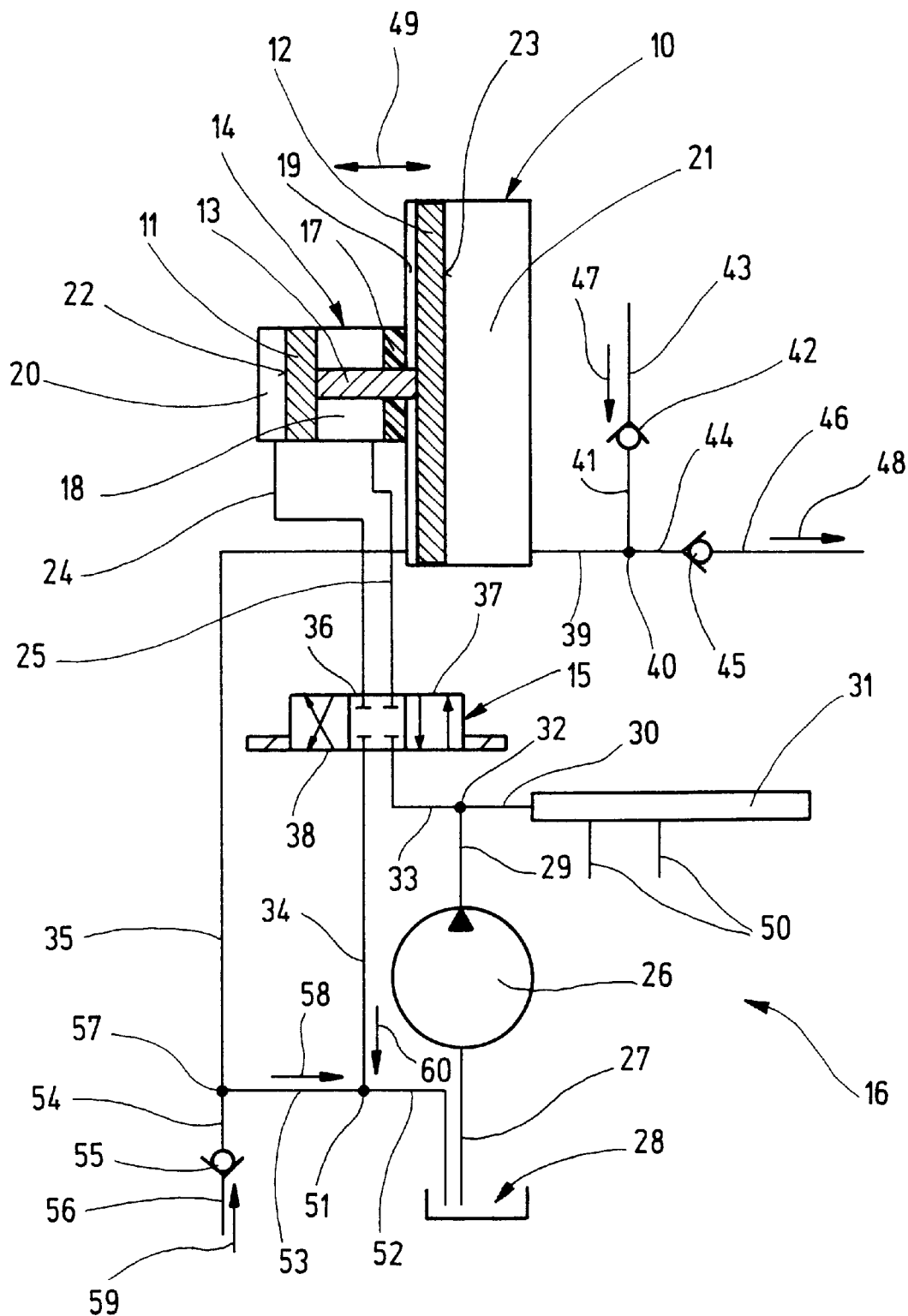

PRECHARGING DEVICE IN A HYDRAULIC BRAKE SYSTEM OF A VEHICLE

BACKGROUND OF THE INVENTION

1. Field of the Invention

The invention relates to a precharging device of a hydraulic brake system of a vehicle for selective imposition of brake fluid under pressure on a brake assembly, by means of a charging unit.

2. Description of the Prior Art

Precharging devices of the type with which this invention is concerned are used for targeted braking of individual vehicle wheels in the context of an electronic stability program (ESP) for the sake of stabilizing a vehicle that is unstable and is spinning. A targeted braking of individual vehicle wheels is done by active brake pressure fixtures by means of a brake assembly in the form of a hydraulic block. To achieve effective stabilization of an unstable, spinning vehicle, relatively high dynamics must be assured by active brake pressure fixtures, so that a targeted braking of the wheels of the vehicle can be done at an operationally optimal instant and with a desired intensity. However, the dynamics of the active brake pressure fixtures is affected by several ambient conditions, especially the prevailing ambient temperature at the time and the ambient air pressure, which is also variable. A low ambient temperature and a low ambient air pressure leads to relatively poor brake pressure buildup dynamics. The brake pressure buildup dynamics are also affected in terms of their effectiveness by the composition, and in particular the water content, of the brake fluid used. To achieve the most persistently uniform, effective brake pressure buildup dynamics, which should essentially be independent of the prevailing, variable ambient conditions, in an electronic stability program (ESP) so-called "precharging" is performed, in which a brake fluid is pumped from a supply tank or from a master cylinder to a hydraulic block of the vehicle by means of a precharging device. By means of such precharging, a precharge pressure is generated on the intake side of a return pump located in the hydraulic block. In known precharging devices, such precharging is done for instance by means of a precharging pump, intended especially for the purpose, or by means of so-called "booster precharging", that is, by means of a driver-independent actuation of a brake booster of the vehicle. Disadvantageously, the known precharging devices are relatively complicated in terms of their construction.

SUMMARY OF THE INVENTION

The precharging device of the invention is characterized in that for activating the imposition of the brake fluid, the charging unit is operatively connected to a fuel supply system of the vehicle. The precharging device offers the advantage that a pressure generating unit already existing in the vehicle and used to supply fuel to the driving engine of the vehicle can be additionally used for precharging for active braking interventions. Thus additional, separate pressure generating units needed solely for creating active brake pressure fixtures are omitted, making a compact and structurally relatively simple design of a precharging device possible. Utilizing a fuel pressure that is preferably permanently present in the fuel supply system, the charging unit can be activated in a reliable, operationally favorable way for brake fluid imposition on a given brake assembly.

Advantageously, the charging unit is embodied as a piston unit. A piston unit is relatively simple to make and is suitable for producing a reliable operative connection with the fuel supply system of the vehicle. Because of the design flexibility of a piston unit, an adapted, operationally favorable precharging can be generated.

The fuel supply system is advantageously embodied as a fuel injection device. Both modern Otto engines and modern Diesel engines have fuel injection systems in which relatively high fuel pressures prevail, regardless of the engine operating state at the time, in specially provided fuel chambers (such as a so-called "rail", in Diesel engines). From these fuel chambers, when the applicable driving engine is in operation, a controlled imposition of fuel on the individual cylinders takes place, in which cylinders combustion occurs in a known manner. A fuel injection device is thus especially suitable, because of the fuel pressures that are typically always present during operation of the internal combustion engine, for establishing an operative connection with a charging unit, which in particular can be embodied as a piston unit.

In a preferred embodiment, the piston unit has a fuel piston and a brake fluid piston operatively connected to the fuel piston by means of a connecting rod, which are displaceable in an adapted cylinder by means of the fuel injection device as a function of a switchable fuel imposition. In this way, it is possible to divide the piston unit into a fuel operation region and a brake fluid operation region, and different operating pressure can prevail in the two operation regions.

Advantageously, the piston unit has a fuel pressure chamber, which is operatively connected by means of a switchable valve to the fuel injection device for selective fuel imposition. A switchable valve, which preferably has a plurality of different functional positions, is especially well suited to producing a reliable, flexible fuel imposition on the fuel pressure chamber and thus for effective precharging.

Advantageously, the piston unit is operatively connected to a fuel reservoir. The fuel reservoir is part of the fuel injection device and is preferably embodied in the form of a so-called rail. It is under a relatively high operating pressure. This operating pressure of the stored fuel serves on the one hand to provided controlled fuel imposition on the corresponding driving or internal combustion engine, and on the other, it can be used simultaneously for activating and generating a precharging operation.

In an alternative embodiment, the piston unit is operatively connected to a fuel pump means. The fuel pump means is likewise part of a fuel injection device and is preferably embodied as a so-called "common-rail pump". Once again, the relatively high fuel pressure generated can be used both for imposing fuel on the applicable internal combustion engine and for performing a precharging operation.

Advantageously, the operational face of the fuel piston is smaller than the operational face of the brake fluid piston. By a selection of the particular size of the operational face of the fuel piston and of the brake fluid piston, it is possible to obtain a hydraulic boost (or reduction) by means of the piston unit. In this way, the relatively great differences in pressure between the fuel region and the brake fluid region of the piston unit can be compensated for relatively simply.

Advantageously, the piston unit has a brake fluid pressure chamber, which is operatively connected to the brake assembly and to a brake fluid tank by means of a respective supply line that has an associated check valve. The check valves serve to prevent deflection of the brake fluid piston, and thus also of the fuel piston, caused by an incident operating brake pressure during braking performed by the driver, and to assure correct filling of the brake fluid pressure chamber.

Advantageously, the valve is embodied as a switchable control and/or regulating valve. A switchable control and/or regulating valve is especially well suited to establishing a flexible, reliable and correct operative connection between the charging unit and the fuel supply system.

In a preferred embodiment, the valve has a functional position that separates the piston unit from the fuel injection device. In such a separating functional position of the valve, additional or alternative security is obtained in terms of the prevailing operating position of the fuel piston at the time, and thus also of the brake fluid piston, especially during driver-performed braking (increased driver braking pressure).

Preferably, the valve together with the fuel pump means and/or the fuel reservoir forms a structural unit. In this way, a compact, easily installed structural unit is obtained, and the requisite high-pressure lines for establishing an operative connection between the valve and the fuel supply system can advantageously be kept relatively short. The piston unit is preferably disposed in the engine compartment of the vehicle.

BRIEF DESCRIPTION OF THE DRAWING

The invention will be described in further detail below in an exemplary embodiment in conjunction with an associated drawing in which the single FIGURE shows a schematic block circuit diagram of a precharging device of the invention, operatively connected to a fuel injection device of a vehicle.

DESCRIPTION OF THE PREFERRED EMBODIMENTS

The drawing schematically shows a piston unit, identified as a whole by reference numeral 10, of a precharging device of a vehicle (not shown), which has a fuel piston 11 and a brake fluid piston 12 operatively connected to it by means of a connecting element 13 embodied as a connecting rod; the fuel piston and the brake fluid piston are received displaceably in an adapted cylinder 14 as indicated by the double arrow 49. The sealing element 17 serves to separate the piston unit 10 in a fluid-tight manner into a driving region, comprising what relative to the fuel piston 11 is a front fuel pressure chamber 20 and a rear fuel pressure chamber 18, and a useful region, comprising what relative to the brake fluid piston 12 is a front brake fluid pressure chamber 21 and a rear ventilation chamber 19. The brake fluid pressure chamber 21 is operatively connected to a brake fluid supply tank (not shown) of the vehicle for brake fluid imposition as indicated by the arrow 47, by means of a brake fluid line 39, a branch 40, a check valve 42, and a brake fluid line 43. From the branch 40, a further brake fluid line 44 leads to a check valve 45, is operatively connected to a brake fluid line 46, leading to at least one brake assembly (not shown) of the vehicle, for imposition of brake fluid on the brake assembly within the context of a precharging operation as indicated by an arrow 48.

The piston unit 10 is operatively connected, by the interposition of a valve 15, to a fuel supply system, identified in general by reference numeral 16, preferably in the form of a fuel injection device. A fuel supply line 27 leads from a fuel tank 28 to a fuel pump 26, which is preferably embodied as a so-called "common-rail pump". From the fuel pump 26, a fuel supply line 29 leads to a branch 32, which is operatively connected to the valve 15 by means of a fuel supply line 33. From the valve 15, a fuel line 25 leads to the rear fuel pressure chamber 18 of the piston unit 10. A fuel reservoir, which preferably has the function of a so-called "common rail", is operatively connected to the branch 32 by means of a fuel line 30. The fuel reservoir 31 is also operatively connected to an injector unit (not shown) of the vehicle by means of fuel lines 50. From the front fuel pressure chamber 20 of the piston unit 10, a fuel line 24 leads to the valve 15, which by means of a fuel return line 34, a branch 51 and a fuel return line 52 is operatively connected to the fuel tank 28. From the ventilation chamber 19, a line 35 leads to a branch 57, which communicates with the branch 51 by a return line 53. From the branch 57, a ventilation line 54 leads to a check valve 55, which is operatively connected to a ventilation unit (not shown) of the vehicle by means of a ventilation line 56. The valve 15 includes three function units 36, 37, 38; the function unit 36 has a barrier function, and the function units 37 and 38 have a fuel imposition function. The valve 15 is embodied as a switchable control and/or regulating valve, so that each of the fuel lines 24, 25, depending on an activated function unit 36, 37, 38 of the valve 15, can be operatively connected to the fuel supply line 33 or the fuel return line 34 (function units 37, 37) or disconnected from them (function unit 36).

In the event that precharging of the brake assembly is necessary, the valve 15 is switched such that the function unit 38 is brought into the operating position. In this way, the valve 15 assures a fuel imposition on the front fuel pressure chamber 20 by means of the fuel pump 26 and/or the fuel reservoir 31, causing a corresponding displacement of the fuel piston 11 and thus also of the brake fluid piston 12 in the cylinder 14. Such a displacement of the brake fluid piston 12 as indicated by the double arrow 49 (toward the right in terms of the drawing) causes a reduction of the operating volume of the brake fluid pressure chamber 21, so that brake fluid is pumped out of that chamber through the brake fluid lines 39, 44 and 46 as indicated by arrow 48 to the brake assembly of the vehicle, thus bringing about a precharging operation. After the termination of the precharging phase, the valve 15 is switched such that the function unit 37 assumes the operating position, so that fuel is pumped through the fuel line 25 by the fuel pump 26 and/or the fuel reservoir 31 into the rear fuel pressure chamber 18. This causes a corresponding displacement of the fuel piston 11 and thus also of the brake fluid piston 12 in the cylinder 14 as indicated by the double arrow (to the left in terms of the drawing), so that the operating volume of the brake fluid pressure chamber 21 is increased. To that end, brake fluid is pumped through the lines 43, 41, 39 as indicated by the arrow 47 from a brake fluid supply tank (not shown) into the brake fluid pressure chamber 21. After the desired operating position of the piston unit 10 is reached, the valve 15 is switched such that the function unit 36 assumes the operating position, so that the valve 15 is in a blocking position (separating the piston unit 10 from the fuel supply system 16).

Upon fuel imposition on the front fuel pressure chamber 20 in accordance with the function unit 38 of the valve 15, fuel located in the rear fuel pressure chamber 18 is returned to the fuel tank 28 through the fuel lines 25, 34 and 52. Also in this operating situation, the ventilation chamber 19 is subjected to air, for instance, through the ventilation lines 56, 54, 35 as indicated by the arrow 59, in order to assure an unhindered displacement of the brake fluid piston 12 in the cylinder 14. Upon imposition of fuel on the rear fuel pressure chamber 18 in accordance with the function unit 37 of the valve 15, fuel is returned from the front fuel pressure chamber 20 to the fuel tank 28 through the fuel line 24 and the fuel return lines 34, 52 as indicated by the arrow 60. In addition, air located in the ventilation chamber 19, and optionally fuel vapor if the separation of the rear fuel pressure chamber 18 from the ventilation chamber 19 by the sealing element 17 is not completely gas-tight, is returned to the fuel tank 28 as indicated by the arrow 58 through the ventilation line 35 and the return lines 53, 52.

Since the fuel piston 11 has a front operational face 22 that is smaller than the front operational face 23 of the brake fluid piston 12, a pressure stepping operation from higher fuel pressures to lower brake fluid pressures takes place in the piston unit 10. Since the brake fluid pressure during a precharging operation is assessed by means of a pilot pressure sensor (not shown), this pressure can be set by means of a separate pressure regulation provided for the purpose. Thus a pressure stepping operation from 1400 bar (fuel pressure), for example, to 5 bar (brake fluid pressure) is effected by means of a separate pressure regulation. The piston unit 10 thus serves to assure the pumping of brake fluid volumes (at relatively low pressure) that are required for the precharging, while utilizing relatively small fuel volumes (at relatively high pressure). The valve 15 can be switched such that the brake fluid piston 12, at an excessive precharging pressure, is returned as indicated by the double arrow 49 (toward the left in the drawing), while if the precharging pressure is too low, it can be advanced (toward the right in the drawing) as indicated by the double arrow 49. In this way, a suitable operation signal of a pilot pressure sensor, which is generally available in systems with an electronic stability program (ESP), can be utilized for regulating the precharging.

Based on such a utilization of fuel pressure generating systems in modern vehicle engines, it is unnecessary to use additional pressure generating devices that would be needed solely for the active pressure fixtures. At the same time, relatively fast, precise precharging can be done, regardless of the ambient conditions prevailing at the time, since a relatively high fuel pressure prevails in the fuel supply system 16 at practically all times during vehicle operation. There is an additional gain in safety with respect to the electronic stability program (ESP), since because of the precise, constant precharging conditions, more-exact hydraulic pressure estimation and thus also more-exact active pressure fixtures are possible. With the omission of irritating precharging noise from a precharging pump that would otherwise have to be activated, there is an additional gain in terms of passenger comfort.

Besides the precharging function, still other related functions can be performed by means of the precharging device of the invention, such as the functions of a so-called "braking assistant" and/or active braking events, which can be called for by a speed control system with active brake interventions (known as "active cruise control"). It is also possible for brake fluid pressure reduction phases, for instance during an activated traction control phase, to be utilized in such a way that the volumes of brake fluid to be returned are used to act upon the brake fluid pressure chamber 21 of the piston unit 10.

The piston unit 10 can be operatively connected by its brake fluid pressure chamber 21 to a hydraulic brake system of a vehicle in a manner similar to a previously known, separate precharge pump.

The foregoing relates to preferred exemplary embodiment of the invention, it being understood that other variants and embodiments thereof are possible within the spirit and scope of the invention, the latter being defined by the appended claims.

I claim:

1. A precharging device of a hydraulic brake system of a vehicle having a pressurized fuel supply system, the precharging device comprising, a charging unit operable for the selective imposition of brake fluid that is under pressure into the brake system, and means operatively connecting said charging unit to said pressurized fuel supply system (16) for converting pressure in said pressurized fuel supply system into pressure in the charging unit.

2. The precharging device of claim 1, wherein said means is embodied as a piston unit (10).

3. The precharging device of claim 1, wherein said fuel supply system is embodied as a fuel injection device (16).

4. The precharging device of claim 2, wherein said piston unit (10) has a fuel piston (11) and a brake fluid piston (12) operatively connected to the fuel piston by means of a connecting rod (13), which are displaceable in an adapted cylinder (14) by means of the fuel injection device (16) as a function of a switchable fuel imposition.

5. The precharging device of claim 2, wherein said piston unit (10) has a fuel pressure chamber (20), and wherein said means comprises a switchable valve (15) operably connected to said fuel pressure chamber to the fuel injection device (16) for selective fuel imposition.

6. The precharging device of claim 2, wherein said fuel supply system comprises a fuel reservoir, and wherein said piston unit (10) is operatively connected to said fuel reservoir (31).

7. The precharging device of claim 2, wherein said fuel supply system comprises fuel pump means (26), and wherein said piston unit (10) is operatively connected to said fuel pump means (26).

8. The precharging device of claim 2, wherein said piston unit has a fuel piston and a brake fluid piston, and wherein the operational face (22) of said fuel piston (11) is smaller than the operational face (23) of said brake fluid piston (12).

9. The precharging device of claim 2, wherein said piston unit (10) has a brake fluid pressure chamber (21), which is operatively connected to the brake assembly and to a brake fluid tank by means of a respective supply line (41, 43; 44, 46) that has an associated check valve (42; 45).

10. The precharging device of claim 5, wherein said valve (15) is embodied as a switchable control and/or regulating valve.

11. The precharging device of claim 5, wherein said valve (15) has a functional position (36) that separates the piston unit (10) from the fuel injection device (16).

12. The precharging device of claim 6, wherein said valve (15) together with the fuel pump means (26) and/or the fuel reservoir (31) forms a structural unit.

13. The precharging device of claim 2, wherein said piston unit (10) is disposed in the engine compartment of the vehicle.

14. The precharging device of claim 4, wherein said piston unit (10) has a fuel pressure chamber (20), and wherein said means comprises a switchable valve (15) operably connected to said fuel pressure chamber of the fuel injection device (16) for selective fuel imposition.

* * * * *